(12) United States Patent
Kuwabara

(10) Patent No.: US 8,583,676 B2
(45) Date of Patent: Nov. 12, 2013

(54) NAVIGATION SYSTEM

(75) Inventor: Tatsuru Kuwabara, Takahama (JP)

(73) Assignees: Toyota Jidosha Kabushiki Kaisha, Toyota-Shi (JP); Denso Corporation, Kariya (JP)

( * ) Notice: Subject to any disclaimer, the term of this patent is extended or adjusted under 35 U.S.C. 154(b) by 193 days.

(21) Appl. No.: 12/599,220

(22) PCT Filed: May 5, 2008

(86) PCT No.: PCT/IB2008/001098
§ 371 (c)(1),
(2), (4) Date: Nov. 6, 2009

(87) PCT Pub. No.: WO2008/135843
PCT Pub. Date: Nov. 13, 2008

(65) Prior Publication Data
US 2010/0306245 A1    Dec. 2, 2010

(30) Foreign Application Priority Data
May 7, 2007   (JP) .................................. 2007-122815

(51) Int. Cl.
*G06F 17/30* (2006.01)
(52) U.S. Cl.
USPC ........................................................ 707/769
(58) Field of Classification Search
USPC ........ 707/759, 760; 345/173; 725/37; 463/63
See application file for complete search history.

(56) References Cited

U.S. PATENT DOCUMENTS

| | | | | |
|---|---|---|---|---|
| 7,814,115 | B2* | 10/2010 | White et al. | 707/765 |
| 8,208,399 | B2* | 6/2012 | Yariv et al. | 370/252 |
| 2005/0137788 | A1 | 6/2005 | Kimura | |
| 2006/0082540 | A1* | 4/2006 | Prior | 345/156 |
| 2006/0224314 | A1 | 10/2006 | Oguchi | |
| 2007/0198485 | A1* | 8/2007 | Ramer et al. | 707/3 |
| 2007/0236468 | A1* | 10/2007 | Tuli | 345/173 |
| 2007/0277196 | A1* | 11/2007 | Steengaard et al. | 725/37 |
| 2008/0102948 | A1* | 5/2008 | Kogo | 463/31 |
| 2008/0153601 | A1* | 6/2008 | Tahara et al. | 463/43 |
| 2008/0192068 | A1* | 8/2008 | Refai et al. | 345/619 |
| 2008/0208819 | A1* | 8/2008 | Wang et al. | 707/3 |
| 2009/0066643 | A1* | 3/2009 | Im | 345/157 |
| 2010/0090971 | A1* | 4/2010 | Choi et al. | 345/173 |
| 2010/0259500 | A1* | 10/2010 | Kennedy | 345/173 |
| 2011/0126097 | A1* | 5/2011 | Isono | 715/702 |

FOREIGN PATENT DOCUMENTS

| | | |
|---|---|---|
| EP | 1 890 110 A2 | 2/2008 |
| JP | 01-138409 A | 5/1989 |
| JP | 08-030763 A | 2/1996 |

(Continued)

OTHER PUBLICATIONS

Office Action issued Feb. 28, 2012 in JP 2010-132113 (Div. of JP 2007-122815) and English translation thereof.

*Primary Examiner* — Sherief Badawi
(74) *Attorney, Agent, or Firm* — Kenyon & Kenyon LLP

(57) ABSTRACT

A navigation system is provided with setting screen displaying means for displaying a setting screen for setting information related to a plurality of search condition parameters; parameter obtaining means for collectively obtaining the information related to the plurality of search condition parameters based on a single input operation that is made via an input portion; and information searching means for searching for preferred information based on the information related to the plurality of search condition parameters obtained by the parameter obtaining means.

16 Claims, 6 Drawing Sheets

(56) References Cited

FOREIGN PATENT DOCUMENTS

| | | |
|---|---|---|
| JP | 10-026932 A | 1/1998 |
| JP | 10-040265 A | 2/1998 |
| JP | 2000-258181 A | 9/2000 |
| JP | 2001-134586 A | 5/2001 |
| JP | 2001-199341 A | 7/2001 |
| JP | 2002-310683 A | 10/2002 |
| JP | 2002-310709 A | 10/2002 |
| JP | 2003-126546 A | 5/2003 |
| JP | 2003-275465 A | 9/2003 |
| JP | 2004-020883 A | 1/2004 |
| JP | 2005-114552 A | 4/2005 |
| JP | 2006-039704 A | 2/2006 |
| JP | 2006-081767 A | 3/2006 |
| JP | 2006-092513 A | 4/2006 |
| JP | 2006-300522 A | 11/2006 |
| WO | WO 99/14701 A1 | 3/1999 |

\* cited by examiner

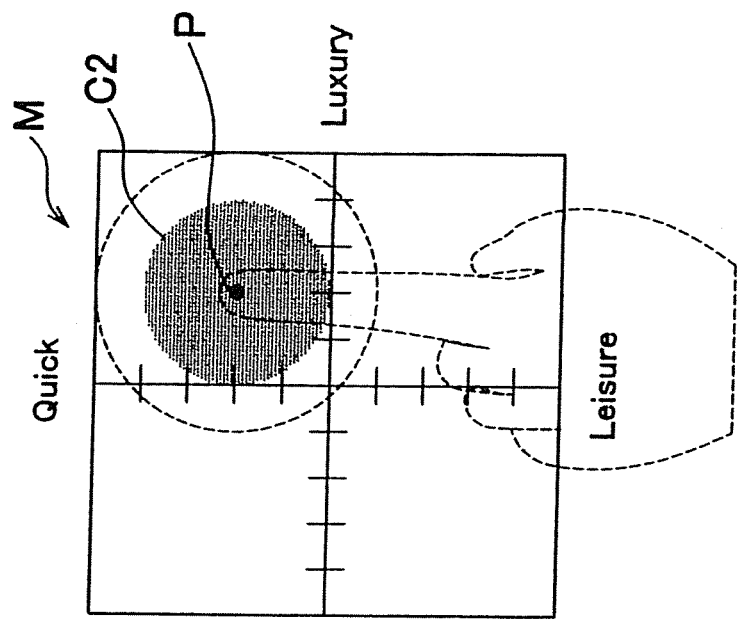
F I G. 3B
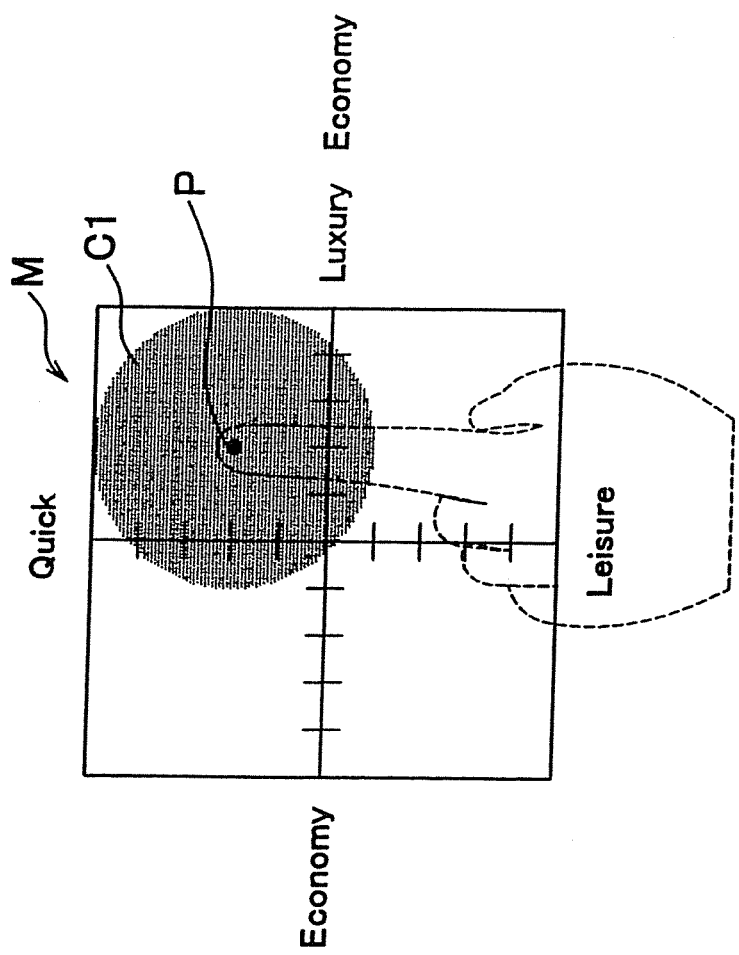
F I G. 3A

NAVIGATION SYSTEM

This is a 371 national phase application of PCT/IB2008/001098 filed 5 May 2008, claiming priority to Japanese Patent Application No. 2007-122815 filed 7 May 2007, the contents of which are incorporated herein by reference.

BACKGROUND OF THE INVENTION

1. Field of the Invention

The invention relates to a navigation system that searches various information such as route information and facility information and the like. More particularly, the invention relates to a navigation system in which search conditions can be easily set.

2. Description of the Related Art

Japanese Patent Application Publication No. 1-138409 (JP-A-1-138409), for example, describes an on-board navigation system which makes it possible to flexibly set search conditions for searching for the best route, e.g., the shortest route (i.e., giving priority to distance) or the fastest route (i.e., giving priority to estimated driving time), for a driver.

When searching for the shortest route, this on-board navigation system adds up distance data for all of the road segments in each route, and selects the route with the smallest total distance data as the preferred route.

Also, when searching for the fastest route, this on-board navigation system adds up estimated driving time data for all of the road segments in each route, and selects the route with the smallest total estimated driving time data as the preferred route.

Further, this on-board navigation system can also search for the best route taking into account both estimated driving time and distance by combining the distance data and the estimated driving time data for all of the road segments in each route, and then select the route with the smallest total cumulative data as the preferred route.

More specifically, the value of a distance coefficient (i.e., a weighting coefficient that is multiplied by each distance data when adding up the distance data) and/or a time coefficient (i.e., a weighting coefficient that is multiplied by each estimated driving time data when adding up the estimated driving time data) is set according to each search condition. For example, when the search conditions give priority to the shortest distance regardless of the estimated driving time, the distance coefficient is increased and the time coefficient is decreased so that the influence from the distance coefficient becomes relatively large with respect to the inclusive sum, and the preferred route having the smallest inclusive sum is then selected.

However, with the on-board navigation system described in JP-A-1-138409, when setting the value of the distance coefficient and the value of the time coefficient for each search condition, those values need to be entered separately. This makes the preparation until an operator can start searching for the preferred route cumbersome. It also makes it difficult for the system to handle frequent requests to change search conditions.

SUMMARY OF THE INVENTION

This invention thus provides a navigation system in which a search condition can be easily set.

A first aspect of the invention relates to a navigation system that includes setting screen displaying means for displaying a setting screen for setting information related to a plurality of search condition parameters; parameter obtaining means for collectively obtaining the information related to the plurality of search condition parameters based on a single input operation that is made via an input portion; and information searching means for searching for preferred information based on the information related to the plurality of search condition parameters obtained by the parameter obtaining means.

Accordingly, the search condition parameters can be set via an easy and effective input operation, thereby improving user-friendliness when the operator wants search results for preferred information quickly or wants to frequently change the search conditions.

In the navigation system according to the foregoing aspect, the setting screen may be formed of a two-dimensional coordinate system having a first search condition parameter assigned to a vertical axis and a second search condition parameter assigned to a horizontal axis, the information related to the plurality of search condition parameters may be a coordinate position selected by the single input operation, and the parameter obtaining means may obtain levels for the search condition parameters based on the coordinate position.

Also, the parameter obtaining means may collectively obtain the allowable ranges for the plurality of search condition parameters based on a coordinate position selected by the single input operation and the amount of time for which the coordinate position continues to be selected.

Furthermore, the selected coordinate position may be displayed on the setting screen, and the allowable ranges may be displayed centered around the selected coordinate position, corresponding to the amount of time for which the coordinate position continues to be selected.

The navigation system having the foregoing structure may also include a display device that displays the setting screen by the setting screen displaying means. Also, the input portion of the navigation system may be a touch panel on the display screen, and the single input operation may be an act of an operator touching the selected coordinate position on the touch panel.

Accordingly, the settings of the two search condition parameters can be easily grasped on the screen, and the search condition parameters can be set via an easy and effective input operation, thereby reducing the chances of an input operation error being made.

Also, the navigation system may be mounted onboard a vehicle.

Accordingly, the time that the driver looks at the screen to set search conditions in order to search for information in a car navigation system can be further reduced.

Also, the preferred information may be route information. Further, the search condition parameters may include at least one of estimated driving time, driving distance, cost, and drivability.

Moreover, the preferred information may be facility information.

Also, the search condition parameters may include at least one of size, age, pricing, and popularity of the facility.

A second aspect of the invention relates to a navigation system search condition setting method. This navigation system search condition setting method includes the steps of displaying a setting screen for setting information related to a plurality of search condition parameters on a display device; detecting a single input operation via an input portion; collectively obtaining the information related to the plurality of search condition parameters based on the single input operation; and searching for preferred information based on the obtained information related to the plurality of search condition parameters.

Also, in the navigation system search condition setting method according to this aspect, the input portion may be a touch panel on the setting screen and the single input operation may be an act of an operator touching the touch panel with a finger. Further, this search condition setting method may also include the steps of detecting contact between the finger and the touch panel; displaying on the setting screen a circle centered around the contact position; displaying the circle larger or smaller according to the contact time; detecting the time at which the finger is removed from the touch panel; and obtaining the information related to the plurality of search condition parameters based on the display of the circle at the time the finger is removed from the touch panel.

Accordingly, the invention is able to provide a navigation system in which search conditions can be easily set.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIGS. 3A and 3B are diagrams (part 1) illustrating a process for setting search condition parameters;

DETAILED DESCRIPTION OF THE EMBODIMENTS

Example embodiments of the invention will now be described with reference to the accompanying drawings.

Figure 1:
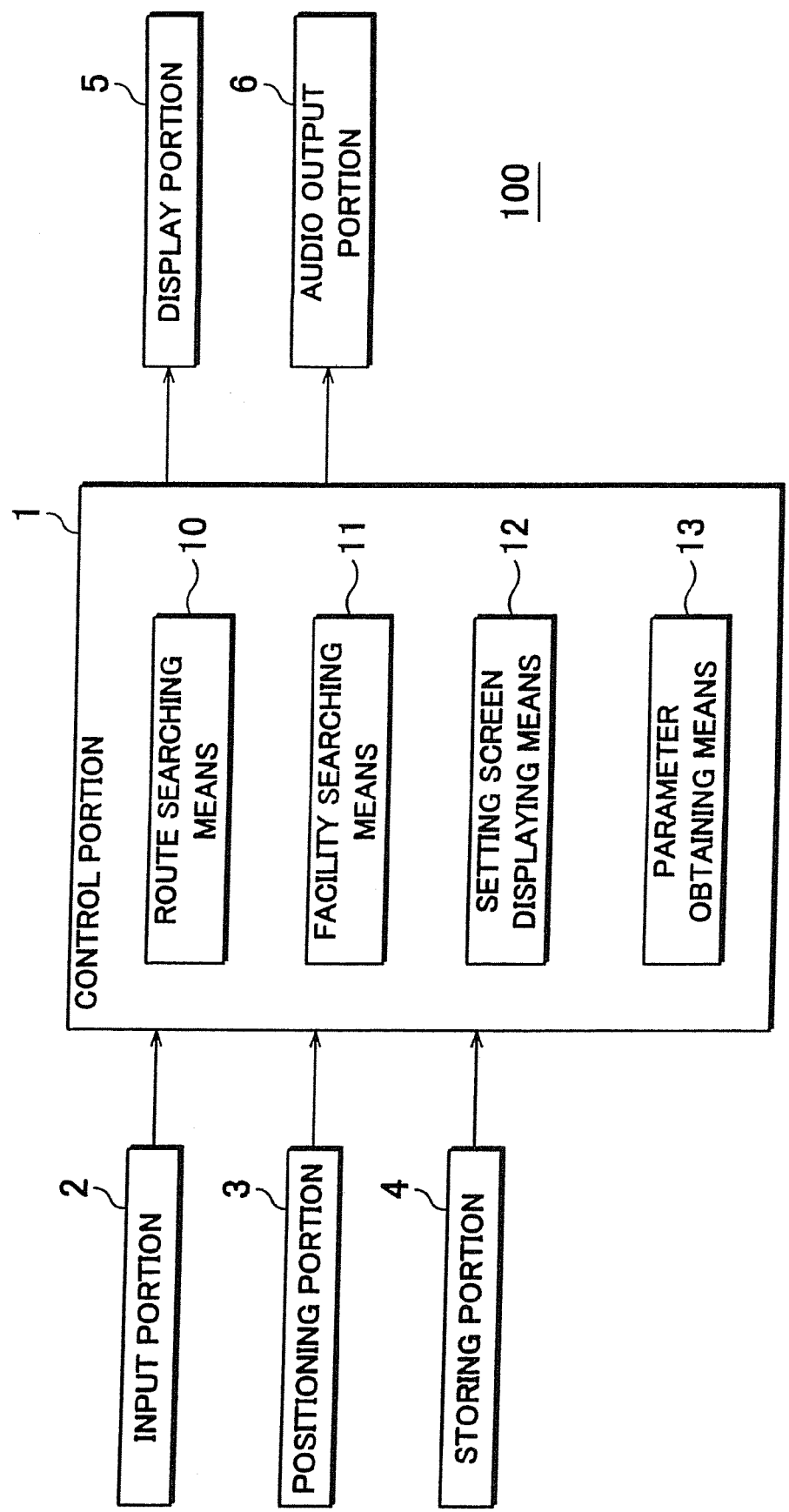
FIG. 1 is a block diagram of a configuration example of a navigation system according to the invention.

FIG. 1 is a block diagram of a configuration example of a navigation system according to the invention. The navigation system 100 is an on-board apparatus that searches various information, such as route information and facility information, based on search conditions set by an operator, and guides the vehicle according to the information that was found. The navigation system 100 includes a control portion 1, an input portion 2, a positioning portion 3, a storing portion 4, a display portion 5, and an audio output portion 6. Incidentally, the navigation system 100 may also have a communication function and obtain various information, such as traffic information, road restriction information and weather information, as needed.

The control portion 1 is a computer having a CPU (Central Processing Unit), RAM (Random Access Memory), and ROM (Read Only Memory) and the like. This control portion 1 stores programs corresponding to route searching means 10, facility searching means 11, setting screen displaying means 12, and parameter obtaining means 13, for example, in the ROM and directs the CPU to execute processing corresponding to those means.

The input portion 2 is a device for inputting various information into the navigation system 100, and may be, for example, a touch panel, a joy stick, a remote control, an escutcheon button or the like, which is used to set the destination for a route search or search condition parameters or the like.

The search condition parameters are parameters that are used when the route searching means 10, which will be described later, searches for a preferred route, or when the facility searching means 11, which will also be described later, searches for a preferred facility. For example, the search condition parameters may include i) the estimated driving time (e.g., long or short), the driving distance (e.g., long or short), the cost (including fuel costs, toll road charges, etc.), or the drivability (i.e., the ease of driving, which is based on the number of left and right turns, the road width, and the like), which are taken into account when searching for a route to a destination, or the size (e.g., large or small), age (e.g., old or new), pricing (e.g., inexpensive or expensive), and popularity (e.g., more popular or less popular) or the like of a facility, which are taken into account when searching for a particular facility.

The positioning portion 3 is a device for determining the position of the vehicle. For example, the positioning portion 3 receives a GPS (Global Positioning System) signal from a GPS satellite by a GPS receiver via a GPS antenna, and determines the position of the vehicle (latitude, longitude, and altitude) based on the received signal. The determination by the positioning portion 3 may be made according to any method such as independent positioning or relative positioning (including interference positioning). However, in this example embodiment, relative positioning, which is extremely accurate, will be used. At this time, the vehicle position may be corrected based on outputs from various sensors such as a steering angle sensor, a vehicle speed sensor, a gyro sensor, or the like, as well as various information received via a beacon receiver or an FM multiplex receiver.

The storing portion 4 is a device for storing various information, e.g., a storage medium such as a hard disk or DVD (Digital Versatile Disk) or the like. The storing portion 4 stores a map information database which systematically stores node positions of intersections and interchanges and the like, distanced of links (elements that connect nodes), link costs (time and cost and the like for traveling that link), and tolls of toll roads and the like.

Also, the storing portion 4 stores a facility information database which systematically stores the positions (latitude, longitude, and altitude), names, prices, popularity (i.e., number of users, customers, or guests), age (i.e., when built), and size (number of occupants, number of parking spaces, dedicated area, etc.) and the like of facilities such as accommodation facilities, restaurants, and amusement parks.

The display portion 5 is a device for displaying various information, and may be, for example, a liquid crystal display or an organic EL display or the like. Based on a control signal from the control portion 1, the display portion 5 displays a destination setting screen, a positioning map (which will be described later) for setting search condition parameters, map data, or various information and the like regarding a preferred route found by the route searching means 10, which will be described later, or a preferred facility found by the facility searching means 11, which will also be described later, or the like.

The audio output portion 6 is a device for audibly outputting various information, and may be an on-board speaker, for example. The audio output portion 6 outputs voice guidance for a preferred route found by the route searching means 10, which will be described later, or a preferred facility found by the facility searching means 11, which will also be described later, or the like.

Next, the various means of the control portion 1 will be described.

The route searching means 10 is means for searching for a preferred route. For example, this route searching means searches for the best route from a predetermined position (such as the current position of the vehicle) to a destination based on the vehicle position (latitude, longitude, and altitude) that has been determined by the positioning portion 3, position information (latitude, longitude, and altitude) of a destination that has been input via the input portion 2, and a map information database stored in the storing portion 4.

When the search condition parameters are set so as to give priority to the shortest driving distance, for example, the route searching means 10 searches for the shortest route using the Dijkstra method as the route searching algorithm.

Also, when the search condition parameters are set so as to give priority to the shortest estimated driving time, for example, the route searching means 10 searches for the fastest route to the destination (i.e., the route that will take the shortest amount of time) based on the legal speed limit, the amount of traffic, and the like. Also, when the search condition parameters are set so as to give priority to the lowest cost, for example, the route searching means 10 searches for a route that does not include toll roads. Or, when the search condition parameters are set so as to give priority to drivability, for example, the route searching means 10 searches for a route having few mergers or left or right turns, or a route that includes wide roads.

Moreover, the route searching means 10 also searches for a route while combining various search condition parameters such as driving distance, estimated driving time, cost, or drivability.

To illustrate this, for example, a case will be described in which each search condition parameter has five levels, with driving distance set at level 1 (the highest level, meaning that the shortest distance is required as a search condition) and cost set at level 3 (the standard level, meaning that the standard cost is required as a search condition).

In this case, the route searching means 10 first searches for a plurality of possible routes (for example, five possible routes that are sensible, i.e., which do not include unnatural left or right turns or the like, and are found based on predetermined search conditions), then ranks those five possible routes in order from shortest to longest according to driving distance, and selects the possible route(s) in the top 20% (which corresponds to level 1; in this case, one route). Meanwhile, the route searching means 10 also ranks those five possible routes in order from the most expensive to the least expensive according to cost, and selects the possible route(s) in the middle 20% (which corresponds to level 3; in this case, one route). Then, if a possible route selected based on driving distance is the same as a possible route selected based on cost (i.e., if two selected possible routes overlap), the route searching means 10 outputs this overlapping possible route as the preferred route.

Incidentally, if there are a plurality of overlapping possible routes, the route searching means 10 may display the plurality of possible routes as preferred routes on the display portion 5 and the operator may select from among them, or the route searching means 10 may automatically select one of the possible routes based on a predetermined selection algorithm. Also, if there are no overlapping possible routes, the display portion 5 may display the message "no preferred route".

Also, the search condition parameters may have allowable ranges. To illustrate this, for example, a case will be described in which driving distance is set having a range from level 1 (i.e., the highest level) to level 3 (i.e., the standard level), and cost is set having a range from level 3 (i.e., the standard level) to level 5 (i.e., the lowest level).

In this case, the route searching means 10 first searches for a plurality of possible routes (for example, five routes), then ranks those five routes in order from shortest to longest according to driving distance, and selects the possible route(s) in the top 60% (which corresponds to levels 1 to 3; in this case, three routes). Meanwhile, the route searching means 10 also ranks those five routes in order from the most expensive to the least expensive according to cost, and selects the possible route(s) in the bottom 60% (which corresponds to levels 3 to 5; in this case, three routes). Then, if a possible route selected based on driving distance is the same as a possible route selected based on cost (i.e., if two selected possible routes overlap), the route searching means 10 outputs this overlapping possible route as the preferred route.

Incidentally, the route searching means 10 makes driving easier by displaying the finally selected preferred route on the screen of the display portion 5 in such a manner that it can be distinguished from the other routes so that the operator can easily recognize the preferred route, as well as by outputting voice guidance for the preferred route from the audio output portion 6.

The facility searching means 11 is means for searching for a preferred facility. For example, the facility searching means 11 searches for a facility in the vicinity of a predetermined location (such as the current position of the vehicle) based on the vehicle position (latitude, longitude, and altitude) that has been determined by the positioning portion 3, the type of facility being searched for (such as an accommodation facility) that has been input via the input portion 2, and a facility information database stored in the storing portion 4.

When the search condition parameters are set so as to give priority to the size of a facility, the facility searching means 11 searches for facilities in which the number of occupants is equal to or larger than a predetermined number, and when the search condition parameters are set so as to give priority to newer facilities, the facility searching means 11 searches for facilities built less than a predetermined period of time ago. Also, when the search condition parameters are set so as to give priority to low pricing, the facility searching means 11 searches for facilities with prices less than a predetermined price. Or, when the search condition parameters are set so as to give priority to the popularity of a facility, the facility searching means 11 searches for facilities in which the number of users, customers, or guests (per month, for example) is equal to or greater than a predetermined number.

Further, similar to the route searching means 10, the facility searching means also searches for a facility while combining various search condition parameters such as size, age, pricing, and popularity and the like of the facility.

To illustrate this, for example, a case will be described in which each search condition parameter has five levels, with size of the facility set at level 1 (the highest level, meaning that a search condition requires that the facility be of the largest size) and age set at level 3 (the standard level, meaning that a search condition requires that the facility be standard in terms of newness).

In this case, similar to the route searching means 10, the facility searching means 11 first searches for a plurality of possible facilities (for example, five possible facilities), then ranks those five possible facilities in order from largest to smallest according to size, and selects the possible facility or facilities in the top 20% (in this case, one facility). Meanwhile, the facility searching means 11 also ranks those five possible facilities in order from the newest to the oldest according to when they were built, and selects the possible facilities or facilities in the middle 20% (in this case, one facility). Then, if a possible facility selected based on size is the same as a possible facility selected based on age (i.e., if two selected possible facilities overlap), the facility searching means 11 outputs this overlapping possible facility as the preferred facility.

Incidentally, if there are a plurality of overlapping possible facilities, the facility searching means 11 may display the plurality of possible facilities as preferred facilities on the display portion 5 and the operator may select from among them, or the facility searching means 11 may automatically select one of the possible facilities based on a predetermined selection algorithm. Also, if there are no overlapping possible facilities, the display portion 5 may display the message "no preferred facility".

Also, the search condition parameters may have allowable ranges. To illustrate this, for example, a case will be described in which facility size is set having a range from level 1 (i.e., the highest level) to level 3 (i.e., the standard level), and facility age is set having a range from level 3 (i.e., the standard level) to level 5 (i.e., the lowest level).

In this case, the facility searching means 11 first searches for a plurality of possible facilities (for example, five facilities), then ranks those five facilities in order from largest to smallest according to size, and selects the possible facility or facilities in the top 60% (in this case, three facilities). Meanwhile, the facility searching means 11 also ranks those five facilities in order from newest to oldest according to when they were built, and selects the possible facility or facilities in the bottom 60% (in this case, three facilities). Then, if a possible facility selected based on size is the same as a possible facility selected based on age (i.e., if two selected possible facilities overlap), the facility searching means 11 outputs this overlapping possible facility as the preferred facility.

The setting screen displaying means 12 is means for displaying a screen for setting the search condition parameters. For example, the setting screen display means 12 displays a positioning map M on the display portion 5 when the navigation system 100 is started up, thus enabling the operator to easily and efficiently set the search condition parameters.

Incidentally, the setting screen displaying means 12 may also make the positioning map M pop up on part of the display portion 5 or appear on the entire display screen of the display portion 5, in response to a predetermined input operation such as the push of a search condition setting button.

Figure 2:
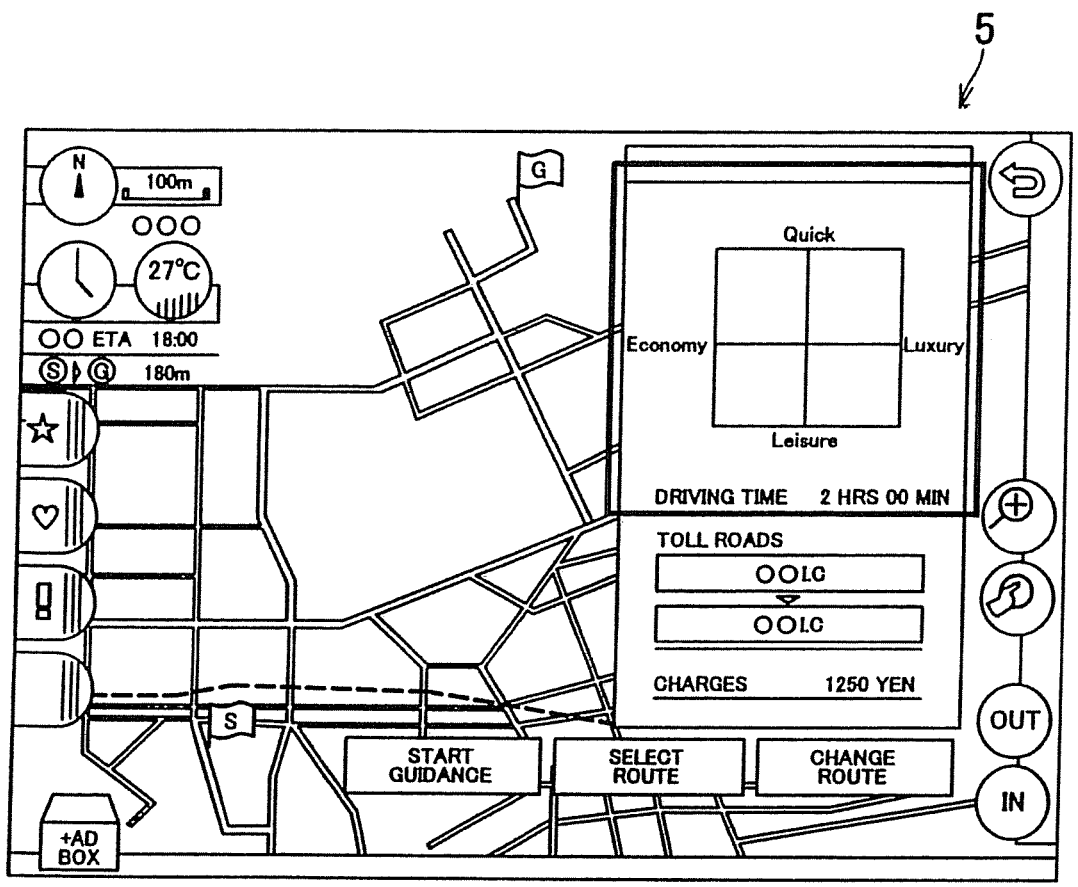
FIG. 2 is a view of an example of a positioning map displayed on a display portion.

FIG. 2 shows an example of the positioning map M displayed on the display portion 5. In the drawing, the positioning map M has popped up on the right half of the display portion 5.

Also, FIG. 2 shows the positioning map M, which is formed by a two-dimensional coordinate system with the search condition parameter "estimated driving time" along the vertical axis and the search condition parameter "cost" along the horizontal axis. On this positioning map M, the level of the estimated driving time increases higher up (in the direction indicated by "Quick") on the vertical axis (meaning that more priority is given to a shorter estimated driving time), while the level of the estimated driving time decreases lower down (in the direction indicated by "Leisure") on the vertical axis (meaning that more priority is given to a more leisurely and comfortable ride where an indirect route may be acceptable or the driver wishes to enjoy the scenery, for example).

Also, on the positioning map M in FIG. 2, the level of the cost increases farther to the right (in the direction indicated by "Luxury") on the horizontal axis (meaning that more priority is given to allowing higher costs for running, such as giving priority to toll roads and the like), while the level of the cost decreases to the left (in the direction indicated by "Economy") on the horizontal axis (meaning that more priority is given to saving money, i.e., avoiding toll roads and the like).

The parameter obtaining means 13 is means for obtaining information relating to the search condition parameters based on a single input operation by the operator. For example, the parameter obtaining means 13 detects the coordinates where a finger of the operator contacts the input portion 2 (touch panel), and obtains the levels of the search condition parameters based on those coordinates (i.e., that coordinate position).

Also, the parameter obtaining means 13 determines, according to the contact time during which the finger of the operator is in contact with the touch panel, an allowable range for the search condition parameters centered around the level corresponding to the coordinates where the finger of the operator contacts the touch panel.

A single input operation refers to a single input operation that is made up of a combination of a series of successive or continuous actions. One example of a single input operation is an input operation that includes the successive actions of touching the touch panel with a finger, maintaining that contact for a predetermined period of time, and then releasing the finger from the touch panel. Another example is an input operation that includes the successive actions of touching the touch panel with a finger, dragging the finger across the touch panel, and then releasing the finger from the touch panel.

FIG. 3 is a diagram illustrating a process by which the navigation system 100 sets the search condition parameters based on a single input operation by the operator (hereinafter, this process will simply be referred to as the "search condition parameter setting routine"). FIGS. 3A and 3B show a state in which a coordinate point P (X=2, Y=2) in the upper right region of the positioning map M is pressed on by the index finger of the left hand of the operator. FIG. 3A shows the state of the positioning map M immediately after being pressed and FIG. 3B shows the state of the positioning map M after the finger has continued to press on the positioning map M for a predetermined period of time (i.e., after the finger has continued to be in contact with the touch panel for a predetermined period of time).

Incidentally, the units used to indicate the coordinate point are the levels of the search condition parameters. In this case, the search condition parameters of estimated driving time and cost each have 11 levels, with the uppermost portion of the drawing corresponding to level 1 of the estimated driving time and the rightmost portion of the drawing corresponding to level 1 of the cost. Also, the coordinate point P (X=2, Y=2) is the point at which both the estimated driving time and the cost are at level 4.

When the operator presses on the coordinate point P, the setting screen displaying means 12 displays a circle C1 of a predetermined radius (such as a radius covering three levels, for example), such that the estimated driving time is set with an allowable range that extends from level 1 (which is the uppermost portion) to level 6 (which is one level below the horizontal axis), and the cost is set with an allowable range that extends from level 1 (which is the rightmost portion) to level 6 (which is one level to the left of the vertical axis), as shown in FIG. 3A.

Also, when the operator continues to press on the coordinate point P for a predetermined period of time (such as two seconds), the setting screen displaying means 12 displays a circle C2 that has a radius which is smaller by one level than the radius of the circle C1, such that the estimated driving time is set with an allowable range that extends from level 2

(which is one level below the uppermost portion) to level 5 (which is the level of the horizontal axis), and the cost is set with an allowable range that extends from level 2 (which is one level to the left of the rightmost portion) to level 5 (which is the level of the vertical axis), as shown in FIG. 3B.

Moreover, if the operator continues to press on coordinate point P for another predetermined period of time (such as two seconds), the setting screen displaying means 12 may display a circle having a radius that has been further reduced.

Then, when the index finger of the left hand of the operator is removed from the touch panel, the parameter obtaining means 13 determines that the search control parameters of estimated driving time and cost are finished being set so it obtains the allowable ranges for the estimated driving time and cost that correspond to the circle displayed at that time and outputs those obtained allowable ranges to the route searching means 10.

Incidentally, the setting screen displaying means 12 may also first display a circle having a small radius (such as a radius that covers one level, for example), and gradually increase the radius of the circle the longer the finger remains in contact with the touch screen (i.e., as the contact time between the finger and the touch screen becomes longer). Also, when the radius reaches the maximum radius (such as a radius covering four levels, for example), the radius of the circle may then return again to the minimum radius (covering one level) and gradually increase again, with this process being repeated until the finger is removed. Incidentally, when the radius is gradually decreased and has reached the minimum radius, the radius of the circle may then return again to the maximum radius and gradually decrease again, with this process being repeated until the finger is removed.

In this manner, the navigation system 100 sets the search condition parameters while displaying the positioning map M on the display portion 5. As a result, the allowable ranges for each of the two search condition parameters can be simultaneously obtained by a single input operation, thereby making it easier and more efficient for an operator to set the search conditions.

Next, another method by which the parameter obtaining means 13 obtains information related to the search condition parameters will be described with reference to FIGS. 4A to 4C.

Figure 4A:
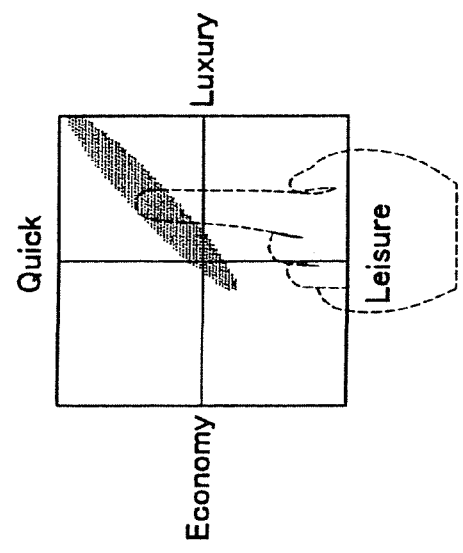
FIGS. 4A, 4B, and 4C are diagrams (part 2) illustrating the process for setting search condition parameters.
Figure 4B:
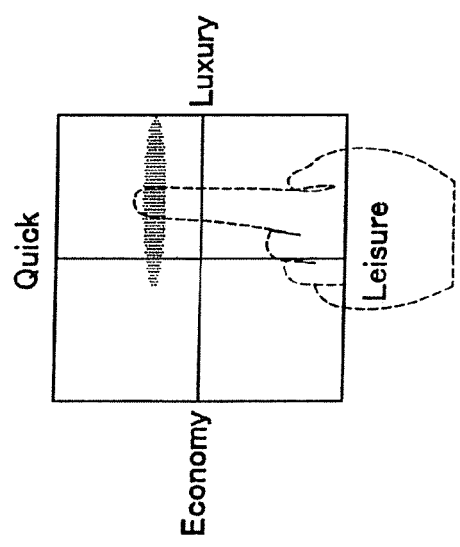
Figure 4C:
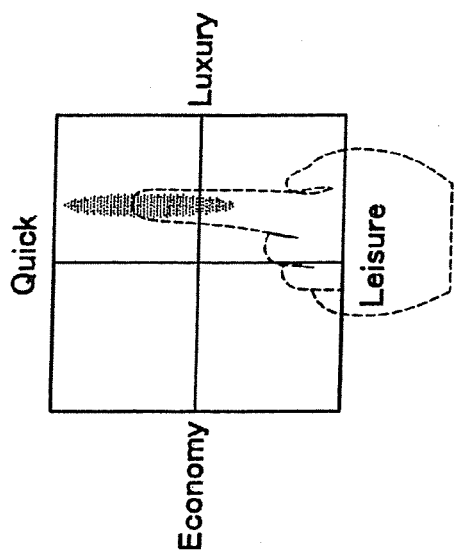

FIGS. 4A to 4C show states of the positioning map after it has continued to be pressed on for a predetermined period of time. Here, instead of gradually reducing the radius of the circle as shown in FIG. 3B, the setting screen displaying means 12 may reduce only the components of the radius that are parallel in the direction of the horizontal axis, or reduce only the components of the radius that are parallel in the direction of the vertical axis, or reduce only the components of the radius that are parallel in the direction of a predetermined angle (such as 135°).

In this case, FIG. 4A shows a state in which the estimated driving time is set with an allowable range that extends from level 1 (which is the uppermost portion) to level 6 (which is one level below the horizontal axis), and the cost is set at level 4 (which is two levels to the right of the vertical axis). FIG. 4B shows a state in which the estimated driving time is set at level 4 (which is two levels above the horizontal axis), and the cost is set with an allowable range that extends from level 1 (which is the rightmost portion) to level 6 (which is one level to the left of the vertical axis).

Also, FIG. 4C shows a state in which the estimated driving time is set with an allowable range that extends from level 1 (which is the uppermost portion) to level 6 (which is one level below the horizontal axis), and the cost is set with an allowable range that extends from level 1 (which is the rightmost portion) to level 6 (which is one level to the left of the vertical axis). However, the target of the preferred route search by the route searching means 10 that is based on the conditions shown in FIG. 4C is limited to a case in which the levels of two search condition parameters correspond, such as a case in which the estimated driving time and the cost are both level 1.

Incidentally, the setting screen displaying means 12 may also reduce the components of the radius that are parallel in the direction of the vertical axis after first reducing only the components of the radius that are parallel in the direction of the horizontal axis, or the setting screen displaying means 12 may also reduce the components of the radius that are parallel in the direction of the horizontal axis after first reducing only the components of the radius that are parallel in the direction of the vertical axis.

Next, a process for creating a circle C3 indicating the allowable ranges for the search condition parameters of "estimated driving time" and "cost" on the positioning map M by a single input operation will now be described with reference to FIGS. 5A to 5C.

Figure 5C:
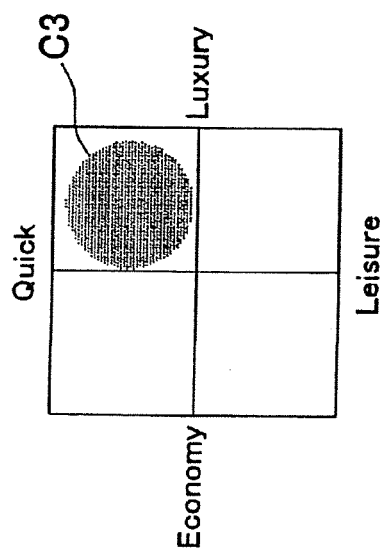
FIGS. 5A, 5B, and 5C are diagrams illustrating a process for creating a circle, which indicates an allowable range for the search condition parameters, on the positioning map.
Figure 5B:
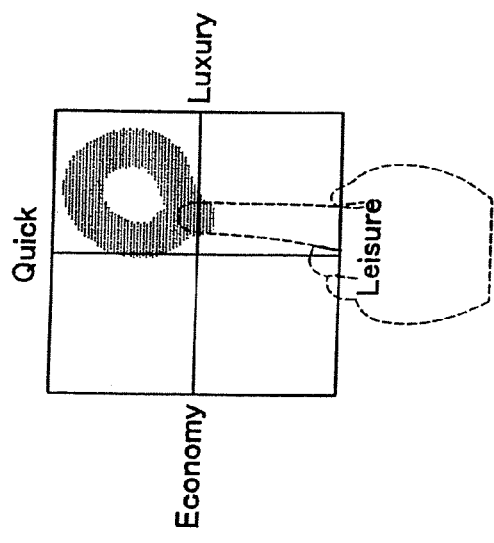
Figure 5A:
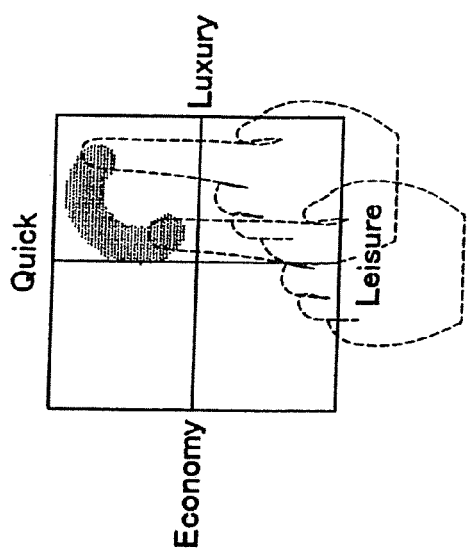

FIG. 5A shows a drag operation in which the operator touches a point on the touch panel with his or her left index finger and starts to draw a circle in the upper right region of the positioning map M.

FIG. 5B shows the line that the operator has drawn according to the drag operation. At this point, the operator signals to the navigation system 100 that he or she is finished drawing by removing his or her finger from the touch panel.

FIG. 5C shows the circle C3 that has been adjusted in shape or size based on the shape or size of the line drawn by the operator according to the drag operation.

In this way, the navigation system 100 obtains the allowable ranges of a plurality of search condition parameters collectively based on the single input operation consisting of the successive actions of touching the touch panel with a finger, dragging the finger, and removing the finger from the touch panel, thereby, making it easier for the operator to set the search conditions.

Figure 6:
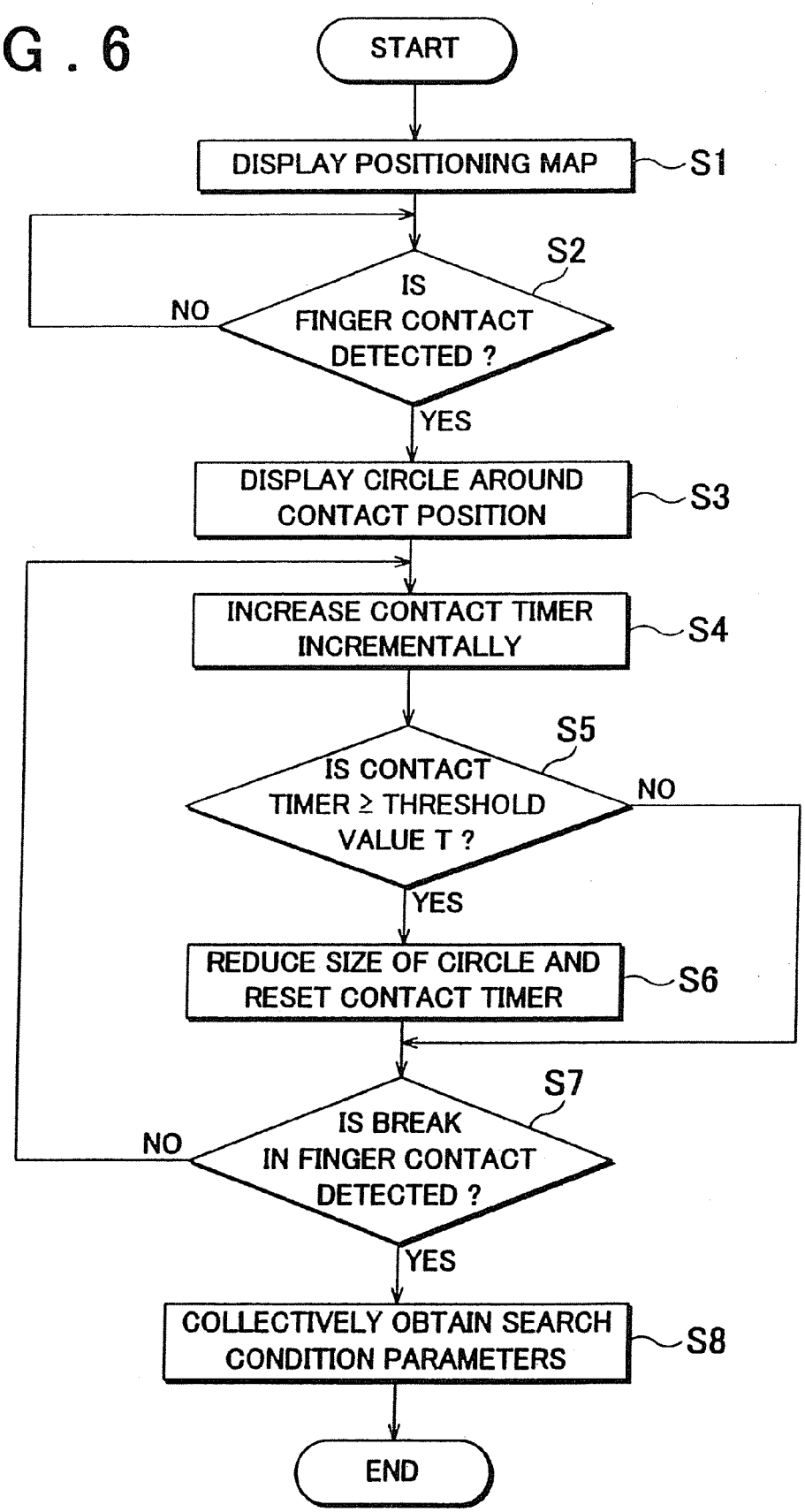
FIG. 6 is a flowchart illustrating a search condition parameter setting routine.

Next, the search condition parameter setting routine will be described with reference to FIG. 6 which is a flowchart that shows this search condition parameter setting routine.

First, the control portion 1 of the navigation system 100 controls the setting screen displaying means 12 to display the positioning map M (see FIG. 2) on the display portion 5 (step S1).

Then the control portion 1 waits until the operator performs an input operation, while monitoring the output of the input portion 2 (i.e., the touch panel) (step S2).

Then if it is detected that a finger of the operator has touched the touch panel based on the output from the touch panel (i.e., YES in step S2), the control portion 1 controls the display portion 5 so that it displays a circle having a predetermined radius (for example, covering three levels) around the coordinate point corresponding to the position where the finger of the operator touched the touch panel (step S3).

Then the control portion 1 increases the value of a contact timer stored in the RAM in increments (step S4) to measure the time for which contact between the finger and the touch panel is maintained.

Next, the control portion 1 compares a value of the contact timer with a threshold value T (step S5). If the value of the contact timer is equal to or greater than the threshold value T (i.e., YES in step S5), the setting screen displaying means 12 reduces the radius of the currently displayed circle by a predetermined number of levels (for example, by one level) and resets the contact timer (step S6), and then determines whether the finger of the operator has been removed from the touch panel, i.e., whether there is a break in finger contact with the touch panel (step S7).

The radius of the circle is reduced in this case in order to narrow the allowable range of the search condition parameters, and the contact timer is reset in order to measure the timing at which the radius of the circle is next reduced.

Incidentally, if the value of the contact timer is less than the threshold value T (i.e., NO in step S5), the control portion 1 determines whether the finger of the operator has been removed from the touch panel without reducing the radius of the circle or resetting the contact timer (step S7).

Then, the control portion 1 repeats steps S4 to S6 until the finger of the driver is removed from the touch panel, while monitoring the output from the touch panel (i.e., NO in step S7). When it is detected that the finger of the operator has been removed from the touch panel (i.e., YES in step S7), the parameter obtaining means 13 collectively obtains the allowable range of the search condition parameter "estimated driving time" and the allowable range of the search condition parameter "cost" at that time (step S8).

Also, the setting screen displaying means 12 may also display another positioning map for setting the search condition parameters "driving distance" and "drivability" at the time the search condition parameters "estimated driving time" and "cost" are set.

Then the navigation system 100 searches for a preferred route using the route searching means 10 based on the settings of the obtained search condition parameters. Alternatively, however, the navigation system 100 may also obtain the settings of the search condition parameters for a facility search using a similar positioning map, and search for a preferred facility using the facility searching means 11.

According to the foregoing structure, the navigation system 100 sets the allowable range for each of the search condition parameters via an easy and efficient input operation, and performs a search based on those allowable ranges for the search condition parameters. As a result, the navigation system 100 is able to quickly provide the operator with the desired information.

While example embodiments of the invention have been illustrated above, it is to be understood that the invention is not limited to details of the illustrated embodiments, but may be embodied with various changes, modifications or improvements without departing from the spirit and scope of the invention.

For example, in the foregoing example embodiment, the navigation system 100 changes the shape or size of a circle, which indicates the allowable ranges of the search condition parameters, as the amount of time that the finger of the occupant is touching the touch panel increases. However, the allowable range of the search condition parameters may also be shown by the display of a square instead of a circle.

Also, while changing the shape or size of the circle or square, the navigation system 100 may also output a sound or voice according to that change from the audio output portion 6 so that the operator can know the current shape or size of the circle or square without looking at it.

Further, the navigation system 100 may also set the allowable ranges of the search condition parameters via another input device. For example, the navigation system 100 may set the allowable ranges of the search condition parameters based on the position of a cursor that is moved by a mouse and the duration time for which a mouse button is pushed down.

Moreover, the navigation system 100 changes the shape or size of the circle that indicates the allowable ranges of the search condition parameters according to the amount of time that the finger of the occupant is contacting the touch panel. However, when the touch panel is provided with a mechanism that detects contact pressure, the navigation system 100 may also change the shape or size of the circle that indicates the allowable ranges of the search condition parameters according to that contact pressure.

Also, the navigation system 100 may also change the shape or size of the circle according to the amount of time that the finger of the occupant is touching the touch panel, when the operator is inputting the general location of a destination.

For example, when setting a faraway destination, the operator tentatively sets the general location of the destination using a circle having a relatively large radius, and the navigation system 100 promptly performs a general route search based on that tentatively set destination. Then when the operator is able to take the time to set the destination in detail, he or she sets the detailed position of the destination using a circle having a relatively small radius, and the navigation system 100 performs a primary detailed route search based on the destination that has been set in detail.

Accordingly, even if there is no time to set the destination in detail, the navigation system 100 is still able to promptly perform a meaningful route search and route guidance by the operator tentatively setting the destination easily and efficiently.

The invention claimed is:

1. A navigation system adapted to be mounted on a vehicle, comprising:
   a setting screen displaying portion that displays a setting screen for setting information related to search condition parameters that numerically represent conditions desired by the user, wherein the search condition parameters consist of a first search condition parameter and a second search condition parameter, wherein the setting screen is formed of a two-dimensional coordinate system with the first search condition parameter assigned to a vertical axis and the second search condition parameter assigned to a horizontal axis;
   a parameter obtaining portion that sets both of the search condition parameters based on a single input operation by the user that selects one or more coordinate positions on the two-dimensional coordinate system that is made via an input portion, wherein the single input operation by the user depends on the search condition parameters that numerically represent the conditions desired by the user; and
   an information searching portion that searches for driving route or facility information based on the two search condition parameters set by the parameter obtaining portion.

2. The navigation system according to claim 1, wherein the information related to the plurality of search condition parameters is an allowable range for each of the plurality of search condition parameters.

3. The navigation system according to claim 2, wherein the parameter obtaining portion simultaneously obtains the allowable ranges for the plurality of search condition parameters based on a coordinate position selected by the single input operation, wherein a range of the search condition parameters is determined by the amount of time for which the coordinate position is touched.

4. The navigation system according to claim 3, wherein the selected coordinate position is displayed on the setting screen; and the allowable ranges are displayed centered around the selected coordinate position, corresponding to the amount of time for which the coordinate position continues to be selected.

5. The navigation system according to claim 1, further comprising: a display device that displays the setting screen by the setting screen displaying portion, wherein the input portion is a touch panel on the display screen, and the single input operation is an act of an operator touching.

6. The navigation system according to claim 1, wherein the information searching portion searches for driving route information.

7. The navigation system according to claim 6, wherein the search condition parameters include at least one of estimated driving time, driving distance, cost, and drivability.

8. The navigation system according to claim 1, wherein the information searching portion searches for facility information.

9. The navigation system according to claim 8, wherein the search condition parameters include at least one of size, age, pricing, and popularity of the facility.

10. A method for setting a search condition for a vehicle navigation system comprising:
    displaying a setting screen for setting information related to search condition parameters that numerically represent the conditions desired by the user, wherein the search condition parameters consist of a first search condition parameter and a second search condition parameter, wherein the setting screen is formed of a two-dimensional coordinate system with the first search condition parameter assigned to a vertical axis and the second search condition parameter assigned to a horizontal axis;
    detecting a single input operation by the user that selects one or more coordinate positions on the two-dimensional coordinate system that is made via an input portion, wherein the single input operation by the user depends on the search condition parameters that numerically represent the conditions desired by the user;
    setting both of the search condition parameters based on the single input operation;
    searching for driving route or facility information based on the search condition parameter settings.

11. The navigation system search condition setting method according to claim 10, wherein the input portion is a touch panel on the setting screen and the single input operation is an act of an operator touching the touch panel with a finger, the search condition setting method further comprising:
    detecting contact between the finger and the touch panel;
    displaying on the setting screen a circle centered around the contact position;
    displaying the circle larger or smaller according to the contact time;
    detecting the time at which the finger is removed from the touch panel; and
    obtaining the information related to the plurality of search condition parameters based on the display of the circle at the time the finger is removed from the touch panel.

12. The navigation system according to claim 3, further comprising:
    a display device that displays the setting screen by the setting screen displaying portion, wherein the input portion is a touch panel on the display screen, and the single input operation is an act of an operator touching the touch panel.

13. The navigation system according to claim 1, wherein the single input operation consists of a single touch by the user.

14. The navigation system according to claim 13, wherein the single touch forms a shape on the screen representing an allowable range, wherein the shape becomes larger or smaller based on the amount of time that the user touches the screen.

15. The navigation system according to claim 14, wherein the allowable range is used to create a ranking of possible routes.

16. The navigation system according to claim 2, wherein the allowable range is repeatedly increased or decreased according to a time during the single input operation.

* * * * *

UNITED STATES PATENT AND TRADEMARK OFFICE
CERTIFICATE OF CORRECTION

PATENT NO. : 8,583,676 B2
APPLICATION NO. : 12/599220
DATED : November 12, 2013
INVENTOR(S) : Tatsuru Kuwabara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Twenty-second Day of September, 2015

Michelle K. Lee
*Director of the United States Patent and Trademark Office*